United States Patent [19]

Olsen

[11] Patent Number: 4,709,800
[45] Date of Patent: Dec. 1, 1987

[54] BOTTLE CONVEYOR WITH BRUSH SPACER

[75] Inventor: Robert F. Olsen, Toledo, Ohio

[73] Assignee: Owens-Illinois Glass Container Inc., Toledo, Ohio

[21] Appl. No.: 856,564

[22] Filed: Apr. 28, 1986

[51] Int. Cl.⁴ ............................................. B65G 47/26
[52] U.S. Cl. ..................................... 198/459; 198/462; 198/633; 198/836
[58] Field of Search .......................... 198/459, 453–455, 198/462, 633, 836, 725, 626, 778; 193/32

[56] References Cited

U.S. PATENT DOCUMENTS

| | | | |
|---|---|---|---|
| 2,332,791 | 10/1943 | Gantzer | 189/462 |
| 2,632,553 | 3/1953 | Stirn et al. | 198/459 X |
| 2,925,926 | 2/1960 | Packman et al. | 198/836 X |
| 2,989,162 | 6/1961 | Kay et al. | 198/459 X |
| 3,261,453 | 7/1966 | Hirs | 198/725 X |
| 3,295,666 | 1/1967 | Kay et al. | 198/778 X |
| 3,722,663 | 3/1973 | Nalbach | 198/836 X |
| 4,026,406 | 5/1977 | Gazzarini | 198/626 X |
| 4,312,697 | 1/1982 | Brummett | 198/836 X |

Primary Examiner—Robert J. Spar
Assistant Examiner—Lyle Kimms
Attorney, Agent, or Firm—H. G. Bruss

[57] ABSTRACT

Apparatus for wrapping shrinkable plastic labels about bottles as they are moved in a single file. As the bottles exit the wrapping machine, they are resting on a moving belt conveyor which is driven in the direction of a heat shrinking tunnel. In order to have the bottles, with the labels applied, pass through a circulating hot air, infrared tunnel in properly spaced intervals to assure proper shrinkage of the tubular labels, a spacing device in the form of a bottle side-engaging set of brushes is used. The brushes have their bristles extending horizontally across the path of movement of the bottles on the conveyor. The bottles are actually pushed at the speed of the labeling machine through the gap between the brushes and therefore the bottles are released by the brushes at equally spaced time intervals and thus become equally spaced on the moving conveyor belt that carries them to the heat shrink tunnel.

4 Claims, 3 Drawing Figures

BOTTLE CONVEYOR WITH BRUSH SPACER

BACKGROUND OF THE INVENTION

The present invention relates to a system for spacing bottles on a horizontal, moving conveyor where the bottles have received wrap-around heat shrinkable labels thereon. The bare bottles are moved through a label applicating machine which adheres the leading edge of a plastic sheet label to the side of the bottle and then rolls the bottle along the length of the label carried on the exterior of a rotating vacuum drum. The trailing vertical edge of the label has a solvent for the plastic applied thereto and this trailing edge is overlapped and thereby adhered to the leading edge. After the bottle has been provided with the label, it is necessary to pass the bottle with label through a heat tunnel to shrink the tubular label to the external configuration of the bottle. This may include shrinking about the heel portion and shoulder portion of a generally cylindrical side wall beverage bottle such as a beer or soft drink bottle.

The plastic label may be formed from a web of foamed polystyrene material with printed indicia on one face thereof. The opposite face of the label will have a methylene chloride or trichloroethane solvent applied at finite areas thereof, usually a pair of vertically spaced areas at the leading edge of the label and a full height area at the trailing edge thereof.

Once the label has been adhered to the bottle and itself, it will exit the label wrapping machine on a horizontal conveyor which will carry the bottle to and through an infrared or other type shrink tunnel or oven to heat shrink the label to the bottle shape.

One such heat shrink tunnel is disclosed in U.S. patent application Ser. No. 690,557, filed Jan. 11, 1985 now U.S. Pat. No. 4,579,614, issued Apr. 1, 1986, in which the bottles with labels are carried on a conveyor through the oven without requiring rotation of the bottles to insure even shrinkage. This tunnel or oven utilizes infra-red heaters along each side of the conveyor with recirculating air heated by the heaters, constantly blowing across the line of bottles moving through the oven. One problem that has been encountered is that if the bottles become too closely spaced or are touching each other the air is able to reach only the sides of the bottles that are facing the heaters and blowers while the adjacent sides, in line with the bottle movement, may not receive enough heat to adequately shrink the sleeves or labels in the relative short time that the bottle is within the oven.

The typical oven may be 5.5 feet long and the bottles may be passing therethrough at a rate of 450 per minute. Thus, an individual bottle may be exposed to the heat for only about two seconds.

It has been suggested that the spacing of the bottles before entry into the oven or tunnel can be done by pocketed starwheels or other complex mechanical systems.

With the foregoing in view, it is an object of the present invention to provide a simple system not requiring mechanically driven mechanisms for spacing the bottles on the conveyor that extends from the label wrap machine to the heat shrink tunnel.

It is a further object of this invention to pass the bottles from the wrap machine through a set of opposing brushes to effectively release the bottles at precisely spaced intervals as they enter the heat shrink tunnel.

Other and further objects will be apparent from the following description taken in conjunction with the drawings.

SUMMARY OF THE INVENTION

Bottles moving on a conveyor are gated from the exit of a label wrap machine to the entrance of an oven by engaging the flow of bottles with a side wall engaging system that holds the bottles but lets the bottles exit on the moving conveyor at spaced intervals thereon so that upon entry to a shrink tunnel they will be at the proper spacing.

DETAILED DESCRIPTION OF THE DRAWINGS

Figure 1:
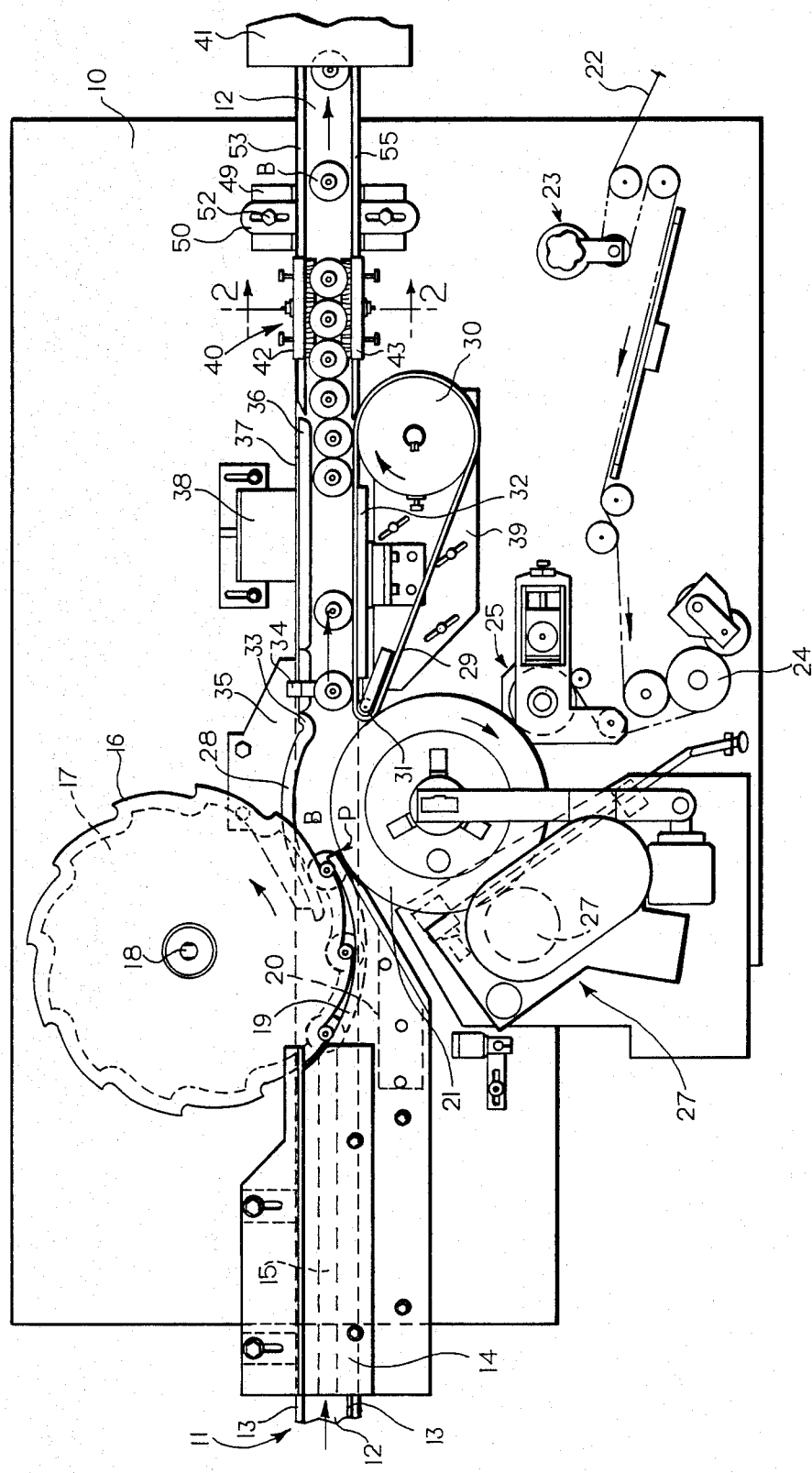
FIG. 1 is a plan view of a bottle labeling system incorporating the bottle spacer of the invention.

With particular reference to FIG. 1, the following is a general description of the operation of the overall labeling system. A horizontal supporting table 10 of generally rectangular configuration serves to support the mechanisms and is itself supported above the floor by a plurality of vertical legs (not shown). Mounted above the table and extending generally across the length of the table is a conveyor generally designated 11. The conveyor 11 has a horizontally moving upper surface 12 which is driven in the direction of the arrow shown thereon. Containers or bottles B to be labeled are supplied at the left hand end of the coneyor 11 in an upright attitude on the surface 12 of the conveyor. With the conveyor surface 12 moving in the direction of the arrow thereon, the bottles will be carried from the left to the right as viewed in FIG. 1. The bottles are guided by rails 13 which extend along either side of the conveyor 12. An overhead member 14 is shown which is provided in its under surface with a guiding slot 15 within which the finish or neck of the bottles will be guided. As can be seen when viewing FIG. 1, the bottles moving from the left approach a pair of vertically spaced, pocketed starwheels 16 and 17 which are both mounted to a vertical axle 18 which is rotated in a counterclockwise direction as viewed in FIG. 1. The starwheel 16 has 12 pockets circumferentially spaced about the circumference thereof which pockets are adapted to engage the neck of the bottles being handled and the starwheel 17 is provided with a like number of pockets that are of somewhat larger dimension and are adapted to engage the sidewall of the bottles being handled.

An arcuate guide 19 has a contour which is coaxial with respect to the axle 18 and serves to hold the necks of the bottles at a precise distance from the axle 18 of the starwheel 16. In addition, there is a lower arcuate guide 20 which is mounted at a height generally the same as the height of the sidewall or body engaging starwheel 17 to maintain the bottles B with their axes vertical during the movement of the bottles by the starwheels 16 and 17. When a bottle reaches the position generally designated P, the side of the bottle B will approach, generally tangentially, the circumferential periphery of a vacuum drum 21. The vacuum drum 21 is a generally cylindrical member having a height somewhat greater than the height of a label which is to be applied to the bottles. The drum 21 will have a plurality of vacuum passages opening through the surfaces thereof to, in effect, grip the individual labels supplied thereto and to convey the labels to the position P. The labels may be formed from a web 22 of foam-film polystyrene which may be pre-printed and which will be coming from a supply (not shown) at the right through a tension takeup device 23. After passing the tension compensating device 23 the web 22 will pass around a driven feed roller 24 and then to a label cutting and handling system generally designated 25. The label cutting device 25 cuts the label at a predetermined point in its length with the leading edge of the label being brought into peripheral engagement with the drum 21. The label will adhere to the outer surface of the drum 21 and move in the direction of the arrow on the drum 21 to carry the label past a glue or solvent applying station 26 where a glue roll or solvent transfer gravure roll 27 will apply the glue or solvent to selected, defined areas of the label. The gravure roll 27 is driven by a mechanism (not shown) generally in a counterclockwise direction, as viewed in FIG. 1, and timed to present the solvent to the leading and trailing edges of the label which is transported by the vacuum drum 21.

At the point P the leading edge of the label will engage the sidewall of the bottle B and the leading edge of the label will become adhered to the bottle. From this point on, the bottle will be held against the surface of the drum by a primary backup pad 28 which is mounted to the surface of the table 10 by a bracket 35. The backup pad 28 may be formed of a resilient foam material such as foam rubber so that it will effectively hold the bottle B against the surface of the drum and as the drum continues to rotate the bottle will be effectively rolled along the surface of the label carried on the surface of the vacuum drum 21.

As previously described, the label carried by the drum 21 will have a vertical, full height, line of solvent applied to the trailing edge thereof and the trailing edge of the label will overlap the leading edge and adhere thereto to form an overlap seam. The container with the label applied continues to be guided by the primary backup pad 28 until it reaches a secondary roll-on belt 29. The secondary roll-on belt 29 passes about a drive roll 30 which is driven in the direction of the arrow shown thereon. The belt 29 also passes about a relatively small diameter inlet roll 31. A stationary, vertical backup surface 32 maintains the belt 29 in a fairly straight path between the drive roll 30 and the inlet roll 31. The bottle B will have the label completely wrapped thereabout prior to the movement of the bottle into engagement with the secondary roll-on belt 29. The primary backup pad 28 has an area 33 which tends to maintain the bottle in contact with the vacuum drum 21 until such time as the bottle engages the secondary roll-on belt 29. This provides a positive drive for the bottle so that when the bottle passes to the secondary roll-on belt, it will be rotated while moved along by the moving surface of the belt 29. The moving belt drives the rolling bottle so that the overlap seam of the label will contact a resilient pressing pad 34 which is mounted beyond the primary pad 28 on a bracket 35 which in turn is mounted to the table 10 as previously described.

A secondary backup pad is positioned in bottle engaging, diametrically opposed, position relative to the secondary roll-on belt 29. The pad 36 is also formed with a foam rubber or like resilient member mounted to a plate 37 which in turn is mounted by bracket 38 to the top of the table 10.

It perhaps should be pointed out also that the secondary roll-on belt 29 and its drive roll 30 and inlet roll 31 are both mounted on a mounting plate 39 which may be moved relative to the upper surface of the table 10, and thus be adjusted toward or away from the center line of the conveyor 12 to accommodate the mechanism for different size bottles. Likewise, the secondary backup pad 36 and the bracket 38 which supports it may be moved toward or away from the center line of the conveyor 12.

As can be seen when viewing FIG. 1, the bottles B, after passing between the secondary backup pad and the secondary roll-on belt, will be held back by the brush spacer, generally designated 40, and that the bottles are moved through the brush spacer 40 in surface-to-surface contact under the force created by the moving belt 29, until such time as the leading bottle clears the spacer 40, at which time the bottle is free to move at the speed of the conveyor 12 into a heat shrink oven 41. The bottles will leave the brush spacer at regular intervals depending upon the speed with which the label wrap machine is operating. It should be understood that the drum 21 and drive roll 30 are commonly driven.

Figure 2:
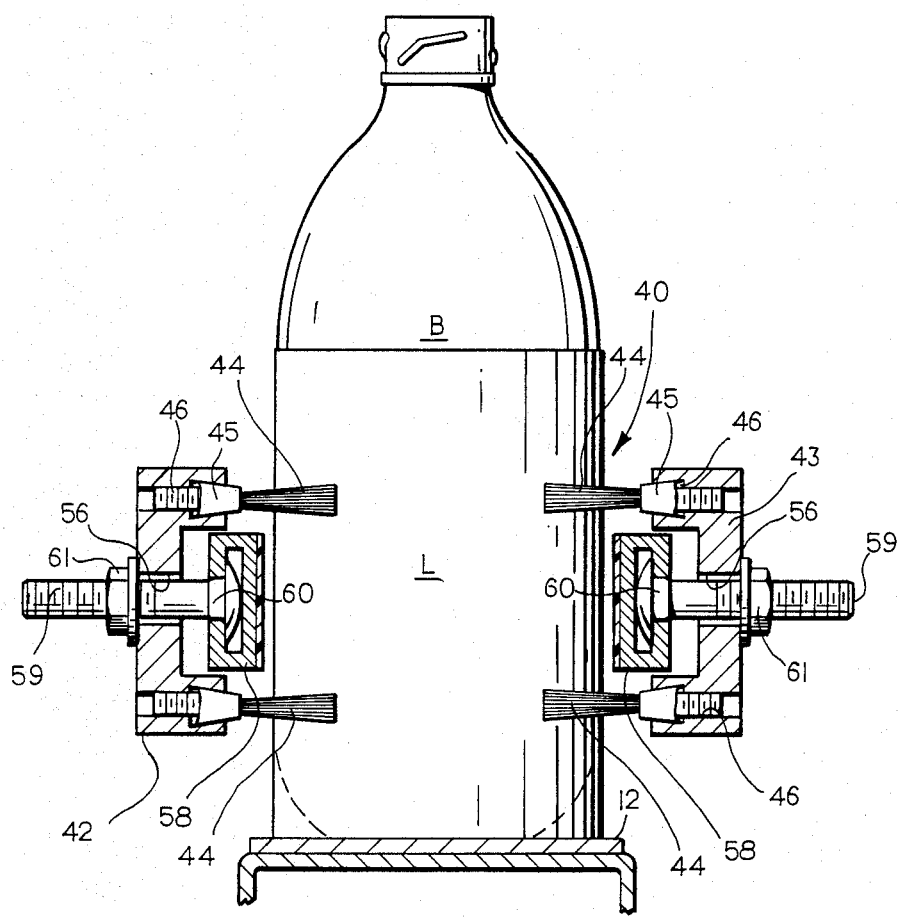
FIG. 2 is a cross-sectional view on an enlarged scale taken at line 2—2 of FIG. 1.
Figure 3:
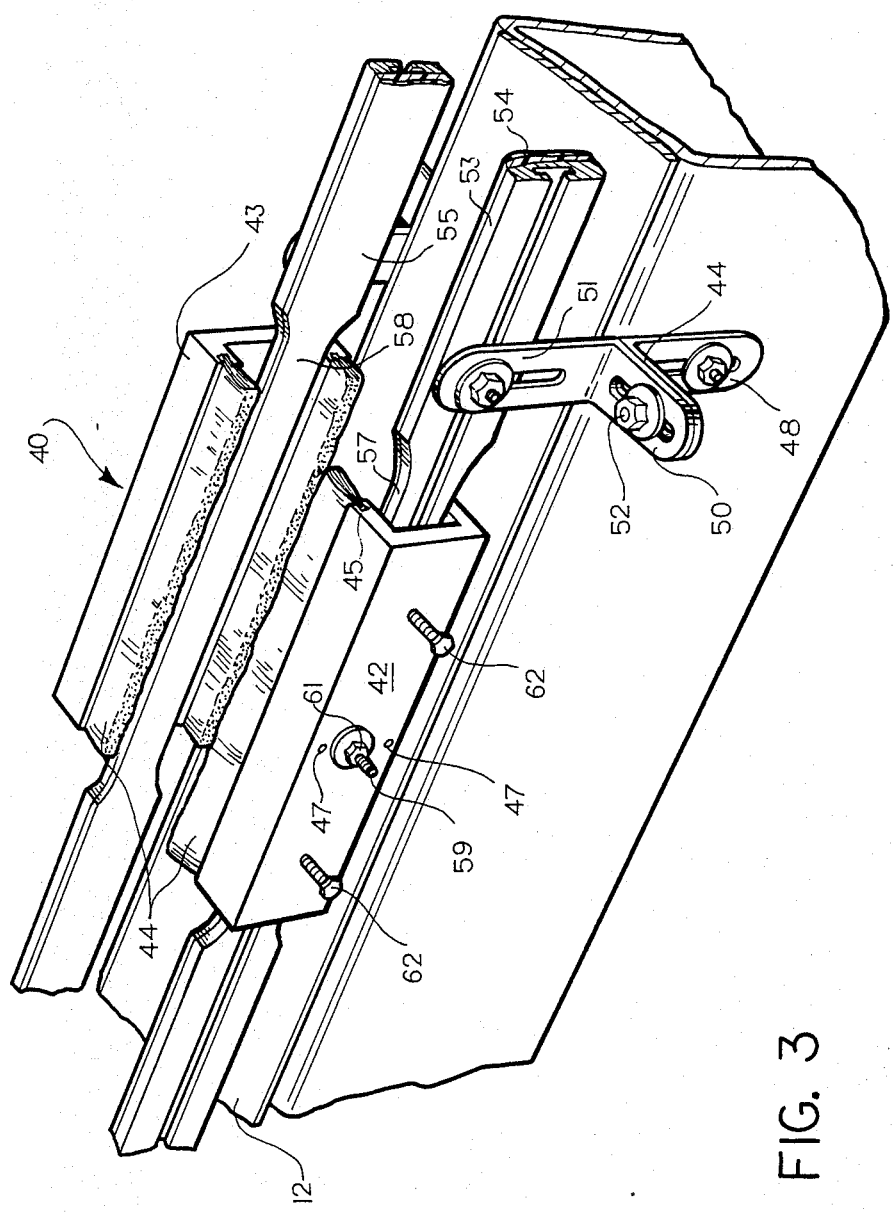
FIG. 3 is a perspective view of the bottle spacer of FIG. 1, on an enlarged scale.

Turning now to FIGS. 2 and 3, the details of the brush spacer of the invention will be described. The bottle spacer 40 generally comprises a pair of oppositely positioned brush or bristle mounting rails 42, 43. The rails 42 and 43 are generally elongated members from each of which a pair of rows of bristles 44 extend. The bristles 44 extend from bristle mounting members 45 at a generally horizontal configuration with the holders 45 positioned within conical cross-section slots 46 which extend the length of the rails 42 and 43. The holder 45 thus can be slid into the slot 46 at one end thereof and the holder 45 may be retained in position in the slot 46 by a set screw 47 which is threaded through a hole in the back of the rail 42 or 43. As shown in FIG. 3, the conveyor 11 has a vertical sidewall to which an angle bracket 48 is bolted. The bracket 48 has a horizontally extending portion 49. Overlying the horizontal portion 49 is a horizontal portion 50 of an angle bracket 41. The two horizontal portions 49 and 50 are bolted together by a bolt 52. The openings in the horizontal portions of the brackets are elongated such that adjustment may be made of the angle bracket 51 relative to the angle bracket 48 to accommodate the system for varying sizes of bottles. The bracket 51 has a side rail 53 bolted thereto with the rail 53 having a covering or facing 54 of a rubber or plastic material. A similar rail 55 is mounted to the opposite side of the conveyor 11 in the same manner. Both rails 53 and 55 extend along opposite sides of the conveyor, beginning near the entrance to the brush spacer device 40 and extending to the entrance to the heat tunnel 41. A portion of the rails 53 and 55 are machined down in height and serve to support the brush mounting rails 42 and 43. As shown in FIGS. 2 and 3, the brush mounting rails are mounted to the portions of the side rails so as to effectively be mounted with the bristles extending toward each other to contact the bottles as they move down the conveyor between the rails 53 and 55. Any adjustment of the rails 53 or 55 relative to the conveyor 12 will also adjust the relative positioning of the two brush mounting rails 42 and 43.

As best shown in FIG. 2, the brush rails 42 and 43 each have a horizontal opening 56 extending therethrough at approximately midway of the length thereof. The brush rails have a generally C-shaped configuration and the horizontal legs thereof extend above and below a portion of the side rails 53 and 55. As can be seen in FIG. 3, the side rails 53 and 55 are machined into smaller height or reduced cross-sectional portions 57 and 58. It is to these reduced portions 57 and 58 that the brush holders or rails 42 and 43 are mounted. The rail portions 57 and 58 have a generally hollow core within which the head of a machine bolt 59 is to seat. The bolts 59 have square shanks 60 which fit within an elongated slot in the rail portion to effectively prevent the bolts 59 from rotating when nuts 61 are threaded on the bolts. The brush holders 42 and 43 are adjustable relative to the rail portions 57 and 58 by reason of the adjustable stop screws 62 which thread through openings in the brush holders and have their inner ends abut against the rail portions 57 and 58.

With the foregoing in view, it will be seen that as the bottles are moved through the gap between the secondary roll-on belt 29 and the secondary backup pad 36 they will be moved into contact with the brushes 44. The frictional hold of the bottles by the bristles 44 is such as to be greater than the frictional relationship of the conveyor surface 12 and the under surface of the bottles. Thus the conveyor surface 12 will move relative to the bottles that are being restrained by the bristles. This will continue until the bottles accumulate and become into bottle-to-bottle contact as shown in FIG. 1, at which time the rearward bottle will be pushed by the movement of the belt 29 relative to the backup pad 36. The pushing of the bottles will continue with this force being greater than the frictional force applied to the bottles by the bristles at which time the row of bottles will move. When the bottles are moved to the extent that the bristles no longer are able to restrain the bottle, the bottle will be released to the movement of the underlying conveyor surface 12. In the operation of the apparatus it should be understood that the bottles will be released from the spacing brush 40 in a timed sequence which is substantially equal to the timed sequence of bottles arriving from the wrap machine. Thus the bottles leaving the spacing unit will be evenly spaced and in the proper relative position to each other so that they may pass through the heat shrink tunnel and the labels thereon will be properly and effectively shrunk into the shape of the underlying bottle.

What is claimed is:

1. Apparatus for handling bottles that are exiting from a label applying machine in an upright attitude on a moving conveyor with means for spacing the bottles at evenly spaced intervals on said conveyor, said spacing means comprising a pair of opposed bottle engaging brushes extending along both sides of said conveyor at a height and relative spacing so as to engage opposite side walls of the bottles, said brushes exerting a holding force on said bottles that is greater than the frictional engagement of the bottles with the moving conveyor, and means for pushing bottles in bottle-to-bottle contact through the zone of engagement of said brushes with said bottles whereby the brushes slow the forward movement of the bottles so that all the bottles engaging the brushes are in surface to surface contact with adjacent bottles; and as soon as the foremost brush engaging bottle leaves the brush engaging area, the conveyor will speed up that bottle, thus creating spacing of the bottle from the next foremost bottle.

2. The apparatus of claim 1 wherein each said brush comprises a horizontally extending block, a pair of vertically spaced, horizontal rows of bristles carried by each said block, and means for mounting each said block to the side of the conveyor.

3. The apparatus of claim 2 wherein said means for mounting each brush block comprises a horizontal guide rails extending along the sides of said conveyor and adjustable means for mounting said block to said guide rails.

4. The apparatus of claim 3 wherein said block is formed with an elongated, wedge-shaped slot extending the length thereof, each said horizontal row of bristles is mounted in an elongated wedge-shaped member, said member adapted to be inserted in said wedge-shaped slot in said block, and means for locking said wedge-shaped member in said block.

* * * * *